United States Patent
Risthaus

(10) Patent No.: US 11,845,378 B2
(45) Date of Patent: Dec. 19, 2023

(54) METHOD FOR PRODUCING AN OPTICAL COMPONENT, OPTICAL COMPONENT AND ILLUMINATING DEVICE FOR A MOTOR VEHICLE

(71) Applicant: HELLA GmbH & Co. KGaA, Lippstadt (DE)

(72) Inventor: Piet Risthaus, Lippstadt (DE)

(73) Assignee: Hella GmbH & Co. KGaA, Lippstadt (DE)

(*) Notice: Subject to any disclaimer, the term of this patent is extended or adjusted under 35 U.S.C. 154(b) by 362 days.

(21) Appl. No.: 17/344,592

(22) Filed: Jun. 10, 2021

(65) Prior Publication Data

US 2021/0300233 A1 Sep. 30, 2021

Related U.S. Application Data

(63) Continuation of application No. PCT/EP2019/083665, filed on Dec. 4, 2019.

(30) Foreign Application Priority Data

Dec. 10, 2018 (DE) .................. 10 2018 131 556

(51) Int. Cl.
*B60Q 1/06* (2006.01)
*F21S 41/275* (2018.01)
(Continued)

(52) U.S. Cl.
CPC .............. *B60Q 1/06* (2013.01); *F21S 41/275* (2018.01); *G02B 27/0977* (2013.01); *F21W 2102/16* (2018.01)

(58) Field of Classification Search
CPC ..... B60Q 1/06; F21S 41/275; F21W 2102/16; G02B 27/0977
See application file for complete search history.

(56) References Cited

U.S. PATENT DOCUMENTS 5,452,191 A 9/1995 Lopez
6,821,001 B2 11/2004 Nakata
(Continued)

FOREIGN PATENT DOCUMENTS

DE 19616863 A1 10/1996
DE 69305026 T2 3/1997
(Continued)

OTHER PUBLICATIONS

International Search Report dated Mar. 17, 2020 in corresponding application PCT/EP2019/083665.

*Primary Examiner* — Jimmy T Vu
(74) *Attorney, Agent, or Firm* — Muncy, Geissler, Olds & Lowe, P.C.

(57) ABSTRACT

A method for producing an optical component for an illuminating device of a motor vehicle, the optical component having at least one structured surface, comprising the following method steps: generating a first virtual representation of the surface that is to be structured of the component, applying a grid of points to the virtual representation of the surface that is to be structured of the component, shifting all or a plurality of the points in a randomized manner in the positive or negative direction in parallel with the respective normals to the surface in order to structure the surface, creating a second virtual representation of the surface that reproduces the structuring achieved by the shifting of the points, and producing the component on the basis of the second virtual representation of the surface.

10 Claims, 3 Drawing Sheets

(51) Int. Cl.
    *G02B 27/09*     (2006.01)
    *F21W 102/16*    (2018.01)

(56) References Cited

U.S. PATENT DOCUMENTS

| | | |
|---|---|---|
| 7,443,588 B2 | 10/2008 | Becker et al. |
| 7,729,054 B2 | 6/2010 | Becker et al. |
| 10,378,718 B2 * | 8/2019 | Kieslinger .............. F21S 41/43 |
| 2015/0219305 A1 | 8/2015 | Michiels et al. |

FOREIGN PATENT DOCUMENTS

| | | |
|---|---|---|
| DE | 10343630 A1 | 5/2005 |
| EP | 1225387 B1 | 3/2011 |

* cited by examiner

METHOD FOR PRODUCING AN OPTICAL COMPONENT, OPTICAL COMPONENT AND ILLUMINATING DEVICE FOR A MOTOR VEHICLE

This nonprovisional application is a continuation of International Application No. PCT/EP2019/083665, which was filed on Dec. 4, 2019 and which claims priority to German Patent Application No. 10 2018 131 556.2, which was filed in Germany on Dec. 10, 2018 and which are both herein incorporated by reference.

BACKGROUND OF THE INVENTION

Field of the Invention

The present invention relates to a method of producing an optical component for an illuminating device of a motor vehicle, wherein the optical component has at least one structured surface. The present invention further relates to an optical component for an illuminating device of a motor vehicle, a plurality of such optical components, and an illuminating device for a motor vehicle having such an optical component.

Description of the Background Art

For example, in the case of illuminating devices designed as headlights for a motor vehicle, edges can be provided in the light distribution projected into the exterior of the vehicle. These can be, for example, the cutoff line of a low beam distribution or vertical edges of a matrix high beam. For example, when the cutoff line (HDG) is mapped by projection modules, the gradient of the light intensity in the area of the cutoff line must be in a prescribed order of magnitude according to a statutory provision known by the abbreviation AK-31. By structuring at least one surface of an optical component of the illuminating device, scattering effects can be produced to soften edges imaged over the optical component or to reduce inhomogeneities in a light distribution. Structures of optical components are known which correspond to a mathematically precisely described geometric shape, such as sinusoidal microstructures. Such structures require very precise manufacturing to achieve the desired result. Small deviations in manufacturing can lead to less than satisfactory results in the statutory review of the cutoff produced with such components. For example, local defects in the structuring can lead to a slight jump in the intensity curve, resulting in a high AK-31 value for small intensities and possibly a double cutoff.

SUMMARY OF THE INVENTION

It is therefore an object of the present invention to provide a method for producing an optical component that can achieve an effective scattering effect due to the structure of the surface. Further, such a component, a plurality of such components, and an illuminating device having such a component shall be specified.

In an exemplary embodiment, the method comprises the following method steps: generating a first virtual representation of the surface that is to be structured of the component, applying a grid of points to the virtual representation of the surface that is to be structured of the component, shifting all or a plurality of the points in a randomized manner in the positive or negative direction in parallel with the respective normals to the surface in order to structure the surface, creating a second virtual representation of the surface that reproduces the structuring achieved by the shifting of the points, producing the component on the basis of the second virtual representation of the surface.

The randomized shifting of all or a plurality of the points in the positive or negative direction in parallel with the respective normals to the surface generates depressions and elevations. It can be provided that the extent of the shifting in parallel with the respective normals to the surface differs between at least two points and/or that the distance differs between at least individual adjacent points. In particular, the extent of the depressions and elevations in parallel with the respective normals to the surface and/or their distance from each other can be randomly distributed. This results in a better statistical distribution of the scattering angles of light passing through the structured surface of the component. In an illuminating device with such a component, this leads in particular to a blur of a projected cutoff line. Furthermore, the stochastic formation of the microstructure can lead to an unambiguous cutoff line and be helpful in concealing color effects at the cutoff line. In addition, the production of the structures is more insensitive to tolerances. A distinction can be made between horizontal and vertical scattering effects.

It is possible that the randomized shift of the points and/or the distance between at least individual adjacent points is based on a statistical distribution, in particular a normal distribution. It can be provided that the modulation bandwidth of the statistical distribution, in particular the variance of the normal distribution, has a different magnitude at least at two locations on the surface. By changing the modulation bandwidth or the variance of the distribution, the statistical distribution of the scattering angles can be influenced.

It is possible that the second virtual representation of the surface, which reproduces the structuring achieved by the shifting of the points, is a NURBS surface. This allows for the method to be integrated into a CAD-based manufacturing process, for example. For example, the NURBS surface can be considered as a CAD specification in the design of the optical component and provide the desired scattering effect.

According to claim 6, the optical component comprises a structured surface, wherein the structure has a plurality of depressions and elevations, the extent of which is randomly distributed in parallel with the respective normals to the surface and/or the distance between them. In particular, the component is a component produced by a method according to the invention.

It can be provided that the component is an at least partially transparent component through which light can pass, such as a lens or a prism, or that the component is a component from which light can be reflected, such as a mirror. Thus, in a variety of different illuminating devices, a component can be selected which is structured by the method according to the invention and achieves the desired scattering effect.

Also provided can be for the plurality of optical components to have identically structured surfaces. According to the method of the invention, a plurality of identically structured components can be generated in a reproducible manner, whereby the desired properties of the components to be manufactured can be ensured.

The illuminating device can comprise an optical component according to the invention.

The illuminating device can be a headlamp with components for generating a cutoff line and/or a headlamp with components for generating a matrix high beam.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

In a method according to the invention, a first virtual representation of a surface 1 to be structured of an optical component is generated. The first virtual representation 1 can be a computer graphic. In the exemplary embodiment shown in FIG. 1, the surface 1 is flat. However, the surface can be curved, for example, non-spherically curved.

The first virtual representation of the surface 1 is provided with a grid of points 2. The points 2 each have a distance dx in a first direction x and a distance dy in a second direction y, perpendicular to the first direction x. Adjacent points 2 can each be at the same distance dx, dy from one another. However, it is also possible that the distance between at least individual adjacent points 2 is different. For example, the distance between at least individual adjacent points 2 can be based on a statistical distribution, in particular a normal distribution.

In a third direction z, perpendicular to the first and the second directions x, y, the points 2 are shifted randomly upwards or downwards. The magnitude dz of the shifting is also randomly distributed, in particular according to a normal distribution. It is possible to shift all of the points 2 randomly upwards or downwards, or only some of the points 2.

Figure 1:
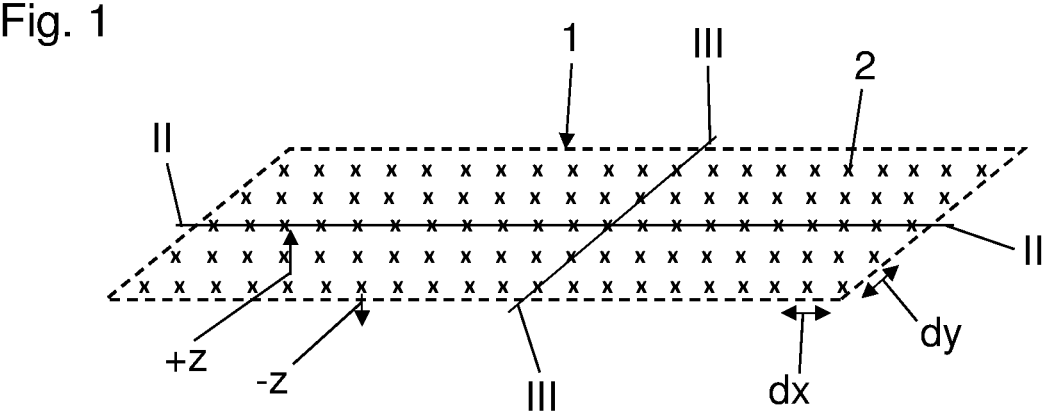
FIG. 1 is a schematic view of a virtual representation of a surface to be structured of a component with a grid of points using a method according to the invention.
Figure 2:
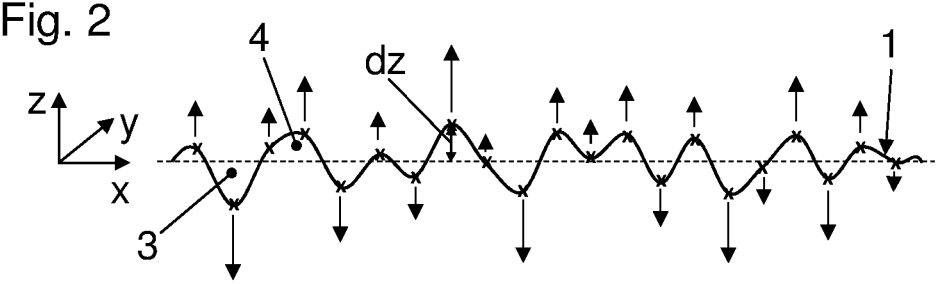
FIG. 2 is a section according to line II-II in FIG. 1.
Figure 3:
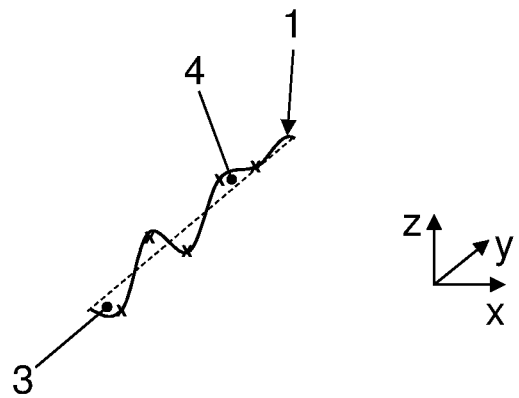
FIG. 3 is a section according to line III-III in FIG. 1.

The shifting of the points 2 results in a dot grid that is partially above and below the first representation of the surface 1. Via the use of NURBS (Non-Uniform rational B-Splines), a second virtual representation of the surface 1 is generated from the dot grid, which is shown in FIG. 1 to FIG. 3. The second virtual representation 1 may also be a computer graphic. Due to the design of the second virtual representation of the surface 1 as a NURBS surface, this representation can be considered as a CAD specification in the design of the optical component and provide for the desired scattering effect.

FIG. 2 and FIG. 3 show how the points 2 lying next to each other in the x-direction and in the y-direction are shifted to a greater or lesser extent in the positive or negative z-direction. The randomized shifting of all or a majority of the points in the positive or negative z-direction and the connection of the points 2 creates a surface 1 with more or less pronounced depressions 3 and elevations 4.

Figure 4:
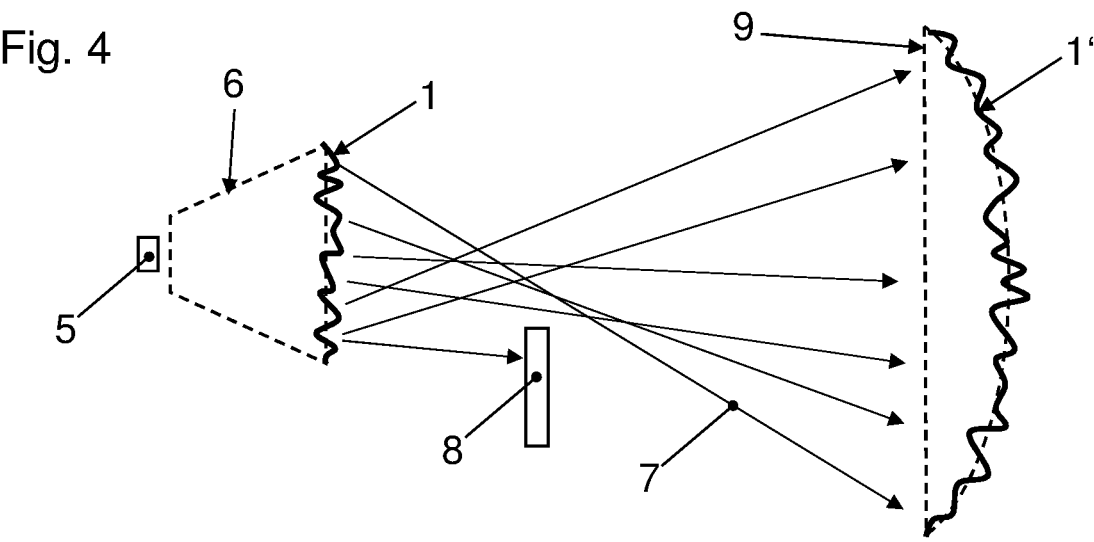
FIG. 4 is a schematic view of an illuminating device according to the invention.

FIG. 4 shows an example of an illuminating device according to the invention. The illuminating device comprises a light source 5 and a schematically shown optical component 6 which serves as primary optics. The exit surface of the component 6, which is formed as a plane surface 1, is a structured surface 1 produced by the method according to the invention.

The illuminating device further comprises a shutter 8 projecting from below into the light 7 emanating from the primary optics, which shutter 8 serves as a cutoff contour to be imaged. Furthermore, the illuminating device comprises an optical component 9 which is arranged behind the shutter 8 and serves as output coupling optics and whose curved exit surface is also a structured surface 1' produced by the method according to the invention.

It is certainly possible to provide only the component 6 or only the component 9 with a structured surface 1, 1'.

FIGS. 5 to 11 show examples of light distributions of illuminating devices with and without components having structured surfaces.

Figure 5:
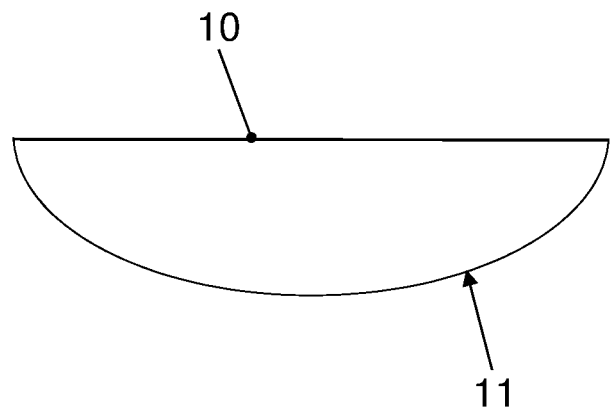
FIG. 5 is a schematic representation of a light distribution generated by an illuminating device for a motor vehicle, wherein the illuminating device does not comprise an optical component according to the invention.

FIG. 5 shows a horizontal edge 10 of a light distribution 11, for example a cutoff line of a low beam, wherein the illuminating device generating the light distribution 11 has no structured surface. The horizontal edge 10 is therefore not softened.

Figure 6:
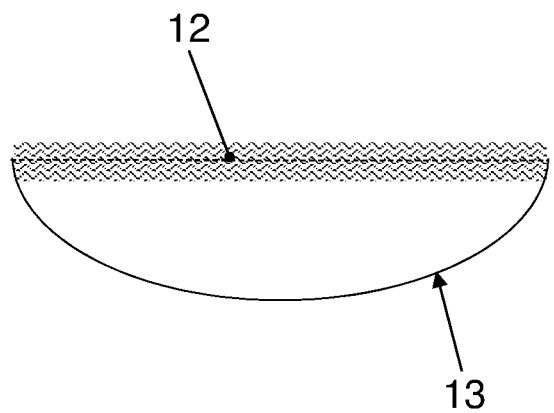
FIG. 6 is a schematic representation of a first light distribution generated by an illuminating device for a motor vehicle according to the invention.

FIG. 6 shows a horizontal edge 12 of a light distribution 13, for example a cutoff line of a low beam, wherein the light distribution 13 is generated by an illuminating device according to the invention with a component 6, 9 having a structured surface 1, 1'. The horizontal edge 12 is greatly softened.

Figure 7:
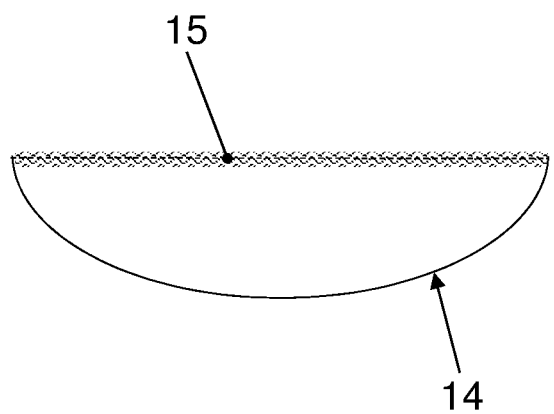
FIG. 7 is a schematic representation of a second light distribution generated by an illuminating device for a motor vehicle according to the invention.

FIG. 7 shows another light distribution 14 generated by an illuminating device according to the invention with a component 6, 9 having a textured surface 1, 1'. This light distribution 14 has a slightly softened horizontal edge 15.

Figure 8:
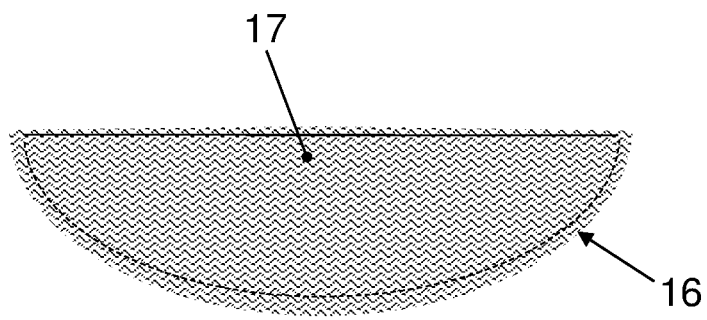
FIG. 8 is a schematic representation of a third light distribution generated by an illuminating device for a motor vehicle according to the invention.

FIG. 8 shows a further light distribution 16 generated by an illuminating device according to the invention with a component 6, 9 having a structured surface 1, 1'. The light distribution 16, serving for example as a low beam, has a homogenized area 17.

Figure 9:
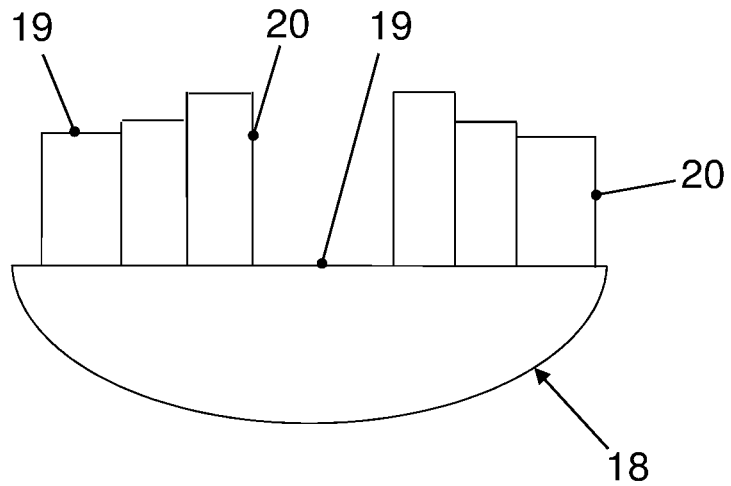
FIG. 9 is a schematic representation of a light distribution generated by an illuminating device for a motor vehicle, wherein the illuminating device does not comprise an optical component according to the invention.

FIG. 9 shows a light distribution 18 in the form of a matrix light, for example, which has both a horizontal edge 19 and vertical edges 20. In this case, the illuminating device generating the light distribution 18 does not have a structured surface. The horizontal edges 19 and the vertical edges 20 are therefore not softened.

Figure 10:
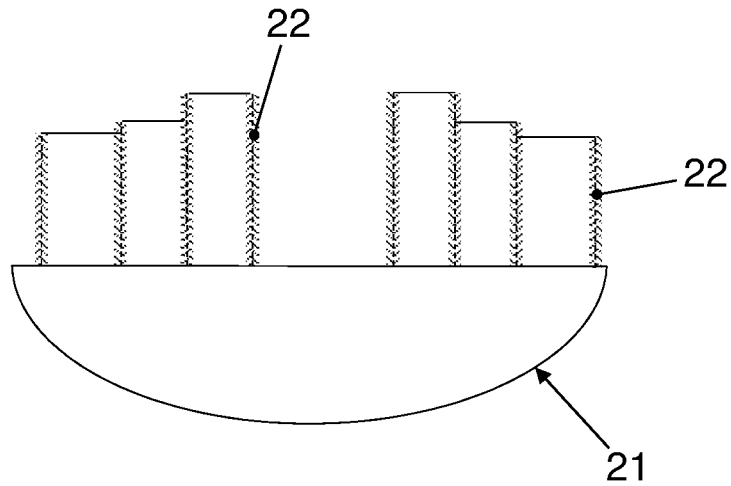
FIG. 10 is a schematic representation of a fourth light distribution generated by an illuminating device for a motor vehicle according to the invention.

FIG. 10 shows a light distribution 21 corresponding to the light distribution 18 in FIG. 8, which is generated by an illuminating device according to the invention with a component 6, 9 having a structured surface 1, 1'. In the light distribution 21, the vertical edges 22 are softened.

Figure 11:
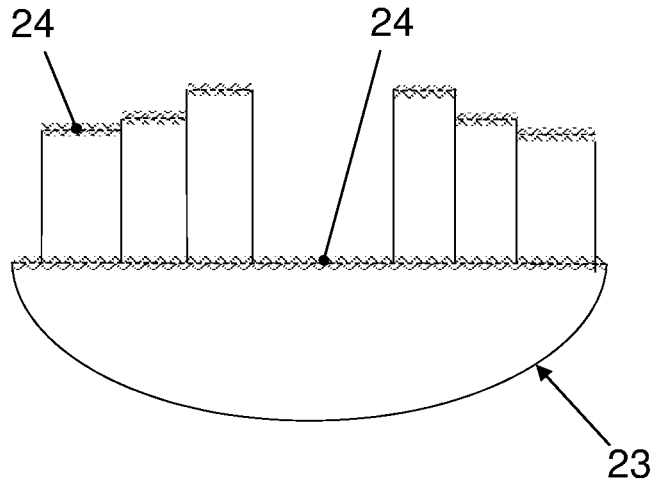
FIG. 11 is a schematic representation of a fifth light distribution generated by an illuminating device for a motor vehicle according to the invention.

FIG. 11 shows a light distribution 23 corresponding to the light distribution 18 in FIG. 8, which is generated by an illuminating device according to the invention with a component 6, 9 having a structured surface 1, 1'. In the light distribution 23, the horizontal edges 24 are softened.

It is certainly possible to generate comparable light distributions with an illuminating device according to the invention in which both the vertical edges and the horizontal The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for producing an optical component for an illuminating device of a motor vehicle, the optical component comprising at least one structured surface, the method comprising:
    generating a first virtual representation of the surface that is to be structured of the component;
    applying a grid of points to the virtual representation of the surface that is to be structured of the component;
    shifting all or a plurality of the points in a randomized manner in a positive or negative direction in parallel with respective normals to the surface in order to structure the surface;
    creating a second virtual representation of the surface that reproduces the structuring achieved by the shifting of the points; and
    producing the component on the basis of the second virtual representation of the surface.

2. The method according to claim 1, wherein the extent of the shifting in parallel with the respective normals to the surface differs between at least two points and/or wherein the distance differs between at least individual adjacent points.

3. The method according to claim 1, wherein the randomized shifting of the points and/or the distance between at least individual adjacent points is based on a statistical distribution or a normal distribution.

4. The method according to claim 3, wherein the modulation bandwidth of the statistical distribution, in particular the variance of the normal distribution, has a different magnitude at least at two locations on the surface.

5. The method according to claim 1, wherein the second virtual representation of the surface, which reproduces the structuring achieved by the shifting of the points, is a NURBS surface.

6. An optical component for an illuminating device of a motor vehicle, the component being produced by the method according to claim 1, the component comprising:
    at least one structured surface;
    a plurality of depressions and elevations formed in the at least one structured surface whose extent is distributed in parallel with the respective normal to the surface and/or whose distance from one another is randomly distributed.

7. The optical component according to claim 6, wherein the component is an at least partially transparent component through which light passes, such as a lens or a prism, or that the component is a component from which light can be reflected, such as a mirror.

8. A plurality of optical components according to claim 6, wherein the components have identically or substantially identically structured surfaces.

9. An illuminating device for a motor vehicle, comprising an optical component according to claim 6.

10. The illuminating device according to claim 9, wherein the illuminating device is a headlamp to generate a cutoff line and/or a headlamp to generate a matrix high beam.

* * * * *